United States Patent
Kezuka

(10) Patent No.: US 6,395,428 B1
(45) Date of Patent: May 28, 2002

(54) GEL ELECTROLYTE AND GEL-ELECTROLYTE BATTERY

(75) Inventor: Koichiro Kezuka, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/447,300

(22) Filed: Nov. 23, 1999

(30) Foreign Application Priority Data

Nov. 26, 1998 (JP) .............................. 10-336027

(51) Int. Cl.$^7$ ................................ H01M 6/14
(52) U.S. Cl. ...................... 429/300; 429/303
(58) Field of Search .................. 429/300, 302, 429/303, 304, 309, 320

(56) References Cited

U.S. PATENT DOCUMENTS

| | | | |
|---|---|---|---|
| 5,429,891 A | * 7/1995 | Gozdz et al. | 429/192 |
| 5,569,559 A | * 10/1996 | Fauvarque | 429/192 |
| 5,948,464 A | * 9/1999 | Delnick | 427/77 |
| 6,015,639 A | * 1/2000 | Gao et al. | 429/307 |

FOREIGN PATENT DOCUMENTS

| WO | WO 97/08765 | 3/1997 |
|---|---|---|
| WO | WO 98/18173 | 4/1998 |
| WO | WO 98/59384 | 12/1998 |

OTHER PUBLICATIONS

Patent Abstracts of Japan, vol. 1999, No. 13, Nov. 30, 1999 & JP 11 219727 A (Hitachi Maxell Ltd), Aug. 10, 1999.
Database WPI, Section Ch, Week 198006, Derwent Publications Ltd., London, GB, Class A85, AN 1980–10064C, XP002132361 & JP 54 162128 A, (Matsushita Elec. Ind. Co. Ltd), Dec. 22, 1979.

* cited by examiner

*Primary Examiner*—Stephen Kalafut
*Assistant Examiner*—Raymond Alejandro
(74) *Attorney, Agent, or Firm*—Sonnenschein, Nath & Rosenthal

(57) ABSTRACT

A gel electrolyte and gel-electrolyte battery. The gel electrolyte and gel-electrolyte battery have an improved cycle characteristic and preservation easiness at high temperatures. The gel-electrolyte battery incorporates a positive-electrode mix layer, a negative-electrode mix layer and a gel-electrolyte layer. The gel-electrolyte layer contains a plasticizer which contains lithium salt, a matrix polymer for dispersing the plasticizer and fibrous insolubles. The fibrous insolubles are contained in the gel electrolyte in a quantity not less than 0.1 wt % nor more than 50 wt %. The ratio of the length and diameter of the fibrous insolubles is not less than 10 nor more than 3000. The length of the fibrous insolubles is not less than 10 $\mu$m nor more than 1 cm and the diameter of the fibrous insolubles is not less than 0.05 $\mu$m nor more than 50 $\mu$m.

17 Claims, 1 Drawing Sheet

GEL ELECTROLYTE AND GEL-ELECTROLYTE BATTERY

RELATED APPLICATION DATA

The present application claims priority to Japanese Application No. P10-336027 filed Nov. 26, 1998 which application is incorporated herein by reference to the extent permitted by law.

BACKGROUND OF THE INVENTION

1. Field of the Invention

The present invention relates to a gel electrolyte containing fibrous insolubles and a gel-electrolyte battery incorporating the gel electrolyte.

2. Description of the Related Art

In recent years, portable electronic apparatuses including camcorders (VTR) portable telephones and portable computers have come on the market. An attempt has been made to reduce the size and weight of the foregoing electronic apparatuses.

As the portable power sources for the foregoing electronic apparatuses, batteries, in particular, secondary batteries, and more particularly lithium batteries have been energetically researched and developed to reduce the thickness of the battery and to realize a foldable structure. As the electrolyte for the above-mentioned batteries, solid electrolytes manufactured by solidifying an electrolyte have energetically been studied. In particular, attention is being given to a solid electrolyte (hereinafter called a "gel electrolyte") containing a polymer compound.

As a plasticizer adaptable to the gel electrolyte, an electrolyte has been employed which has been prepared by dissolving lithium salt, such as $Lipf_6$, in a non-aqueous carbonate solvent of, for example, propylene carbonate (PC) or γ-butyrolactone. In the foregoing case, a gel electrolyte exhibiting a relatively high conductivity can be obtained. Thus, the foregoing structure has been expected to be put into practical use.

The non-aqueous solvent, such as PC or γ-butyrolactone, which is capable of improving-ion conductivity, however, deteriorates the mechanical strength of the gel electrolyte depending on the content of the non-aqueous solution. Hence, it follows that the cycle characteristic and reservation easiness of the lithium-ion battery deteriorate excessively. Further, an adverse influence is exerted on the characteristics of the battery including the discharge capacity.

Also, a gel electrolyte which does not incorporate the non-aqueous solvent, such as PC or γ-butyrolactone, encounters the foregoing problems if the glass transition point, the molecular weight of the matrix polymer contained in the gel electrolyte or the molecular weight Also, a gel electrolyte which does not incorporate the non-aqueous solvent, such as PC or γ-butyrolactone, encounters the foregoing problems if the glass transition point, the molecular weight of the matrix polymer contained in the gel electrolyte or the molecular weight is low similar to the plasticizer.

In an embodiment, the present invention provides a gel electrolyte comprising: a plasticizer having lithium salt; a matrix polymer for dispersing the plasticizer; and fibrous insolubles.

SUMMARY OF THE INVENTION

In view of the foregoing, an object of the present invention is to provide a gel electrolyte which is capable of improving the cycle characteristic of a lithium-ion battery and preservation easiness at high temperatures and a gel-electrolyte battery incorporating the gel electrolyte.

To achieve the foregoing object, according to one aspect of the present invention, there is provided a gel electrolyte comprising: a plasticizer containing lithium salt; matrix polymer for dispersing the plasticizer; and fibrous insolubles.

In an embodiment, the present invention provides a gel-electrolyte battery comprising: a positive-electrode-mix layer; a negative-electrode-mix layer; and a gel-electrolyte layer, wherein the gel-electrolyte layer is constituted by a gel electrolyte having a plasticizer which contains lithium salt, a matrix polymer for dispersing the plasticizer and fibrous insolubles.

The gel electrolyte and the gel-electrolyte battery according to the present invention have the structure in which the gel electrolyte constitutes the gel electrolyte layer having the fibrous insolubles. Therefore, the mechanical strength of the gel electrolyte and the gel electrolyte layer constituted by the gel electrolyte can be increased. Moreover, the cycle characteristic and preservation easiness at high temperatures can be improved.

Other objects, features and advantages of the invention will be evident from the following detailed description of the preferred embodiments described in conjunction with the attached drawings.

DESCRIPTION OF THE PREFERRED EMBODIMENTS

Figure 1:
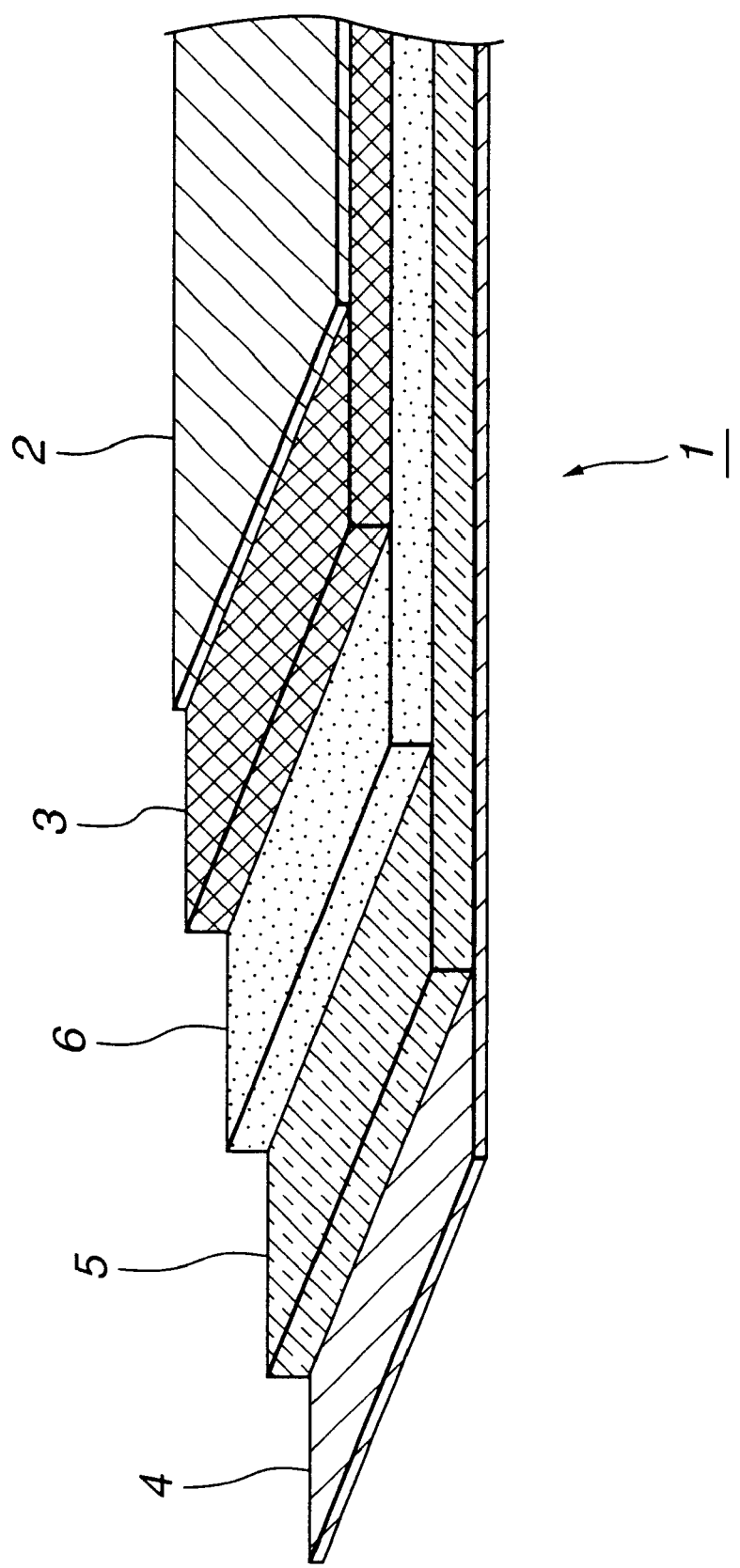
FIG. 1 is a diagram showing the structure of a gel-electrolyte battery.

Embodiments of the gel electrolyte and a gel-electrolyte battery according to the present invention will now be described.

The gel electrolyte incorporates fibrous insolubles, a plasticizer having lithium salt and a matrix polymer in a quantity not less than 10 wt % nor more than 50 wt %. When the insolubles contained in the gel electrolyte are fibrous insolubles as described above, the mechanical strength of the gel electrolyte can be maintained at a lower concentration as compared with spherical insolubles.

The fibrous insolubles are insoluble or swollen when the fibrous insolubles are, at 100° C. for 24 hours, immersed in an electrolytic solution for use when the gel electrolyte is prepared. Moreover, the ratio of the length of the fibrous insolubles and the diameter of the fibrous insolubles may be 10 or higher.

It is preferable that the content of the fibrous insolubles employed to serve as a component of the gel electrolyte is not less than 0.1 wt % nor more than 50 wt % of the gel electrolyte. If the quantity of the fibrous insolubles contained in the gel electrolyte is too small, the mechanical strength cannot be maintained in spite of a permitted high ion conductivity. If the quantity of the fibrous insolubles contained in the gel electrolyte is too large, the ion conductivity is lowered in spite of the maintained high mechanical strength. When the content of the fibrous insolubles in the gel electrolyte is not less than 0.1 wt % nor more than 50 wt %, both of the required ion conductivity and mechanical strength can be realized.

It is preferable that the fibrous insolubles have a structure having a ratio of the length and diameter of the fiber which satisfies a range not less than 10 nor more than 3000. It is preferable that the length of fibers of the fibrous insolubles satisfying the foregoing ratio of the length and the diameter of the fiber be 10 µm to 1 cm and that the diameter of the same be 0.05 µm to 50 µm.

In particular, it is preferable that the fibrous insolubles are short fibers exhibiting excellent dispersing characteristics. The fibrous insolubles of the foregoing type may be exemplified by an inorganic oxide, such as $Al_2O_3$, $SiO2$, $ZrO$, $BaO$ or ITO; an inorganic substance, such as TiN, WC, $B_4C$ or SiC; a hydrocarbon polymer, such as polyethylene or polypropylene, an acrylic polymer, such as polyethylene-acrylic acid copolymer; an aromatic ether polymer, such as polyethylene terephthalate; a polyamide, such as nylon; an aromatic polyamide, such as poly-p-phenylene terephthalamide; a cellulose; and a crosslinked material of polyethylene oxide or acrylic polymer.

The lithium salt which is contained in the plasticizer may be known lithium salt for use in a usual electrolyte of a battery. It is preferable that any one of the following materials may be employed: $LiPF_6$, $LiBF_4$, $LiAsF_6$, $LiClO_4$, $LiCF_3SO_3$, $LiN(SO_2CF_3)_2$, $LiC(SO_2CF_3)_2$, $LiAlCl_4$ and $LiSiF_6$. In particular, it is preferable that $LiPF_6$ or $LiBF_4$ is employed from a viewpoint of stability of oxidation.

It is preferable that the lithium salt, such as $LiPF_6$, of the plasticizer satisfy a range from 0.1 mol/l to 3.0 mol/l; more preferably, a range not less than 0.5 mol/l nor more than 2.0 mol/l may be used.

The matrix polymer for gelling the plasticizer may be any one of a variety of polymers for use to constitute the gel electrolyte when the gel electrolyte is prepared. For example, any one of the following materials may be employed: a fluorine polymer, such as vinylidene fluoride; a vinylidene fluoride-hexafluoropropylene copolymer; an ether polymer, such as ethylene oxide or its crosslinked material; and an acrylonitrile. In particular, the fluorine polymer, such as vinylidene fluoride or fluoride-hexafluoropropylene copolymer may be employed from a viewpoint of stability of oxidation and reduction.

A gel-electrolyte battery 1 incorporating the gel electrolyte layer composed of the foregoing gel electrolyte will now be described.

As shown in FIG. 1, the gel-electrolyte batter 1 comprises a positive-electrode mix layer 3 formed on a positive-electrode collector 2; a negative-electrode mix layer 5 formed on a negative-electrode collector 4; and a gel-electrolyte layer 6 formed between the positive-electrode mix layer 3 and the negative-electrode mix layer 5.

The positive-electrode mix layer 3 incorporates an active material of the positive electrode which is a metal oxide, metal sulfide or specific polymer to be adaptable to the type of a required battery. When, for example, a lithium-ion battery is constituted, the metal sulfide or metal oxide, such as $TiS_2$, $MoS_2$, $NbSe_2$ or $V_2O_5$, which does not contain lithium; or a lithium composite oxide mainly composed of $Li_xMO_2$ (where M is one or more types of transition metal and x, which varies depending on the duration of charge/discharge of the battery, is not less than 0.05 nor more than 1.10) is incorporated. It is preferable that the transition metal M which constitutes the lithium composite oxide in the positive-electrode mix layer 3 is Co, Ni or Mn. The lithium composite oxide is exemplified by $LiCoO_2$, $LiNiO_2$, $LiNi_{1-y}O_2$ (where 0<y<1) and $LiMn_2O_4$. The foregoing lithium composite oxide is an active material for the positive electrode which is capable of generating high voltage and which exhibits a satisfactorily high energy density.

The positive-electrode mix layer 3 may contain one or more types of the foregoing active material of the positive electrode. When the positive-electrode mix layer 3 is constituted by using the foregoing active material of the positive electrode, a known conductive material and a binder may be added.

The negative-electrode mix layer 5 is made of a material into which lithium can be doped and from which lithium can be dedoped. The material of the foregoing negative-electrode mix layer 5 may be a carbon material, for example, a non-graphitizable carbon material or a graphite material. Specifically, any one of the following materials may be employed: a sintered material of organic polymer compound obtained by baking, at a proper temperature, and baking pyrocarbon, cokes, such as pitch cokes, needle cokes, petroleum cokes, graphite, vitreous carbon, phenol resin or furan resins carbon fiber and active carbon. As a material of the negative-electrode mix layer 5 which permits doping/dedoping lithium, a polymer, such as polyacetylene or polypyrrole or oxide, such as $SnO_2$, may be employed.

When the negative-electrode mix layer 5 is constituted by using the foregoing material, a known binder may be added.

The gel-electrolyte layer 6 is formed by applying the gel electrolyte having the above-mentioned composition to the positive-electrode mix layer 3 and the negative-electrode mix layer 5 and by joining and contact-bonding the surfaces applied with the gel electrolyte to each other.

The shape of the gel-electrolyte battery having the above-mentioned structure is not limited. The gel-electrolyte battery may variously be formed into a cylindrical shape, a square shape, a coin shape or a button shape. Also the size of the gel-electrolyte battery may have a large size, a small size or a thin structure.

EXAMPLES

Examples and comparative examples of the gel-electrolyte battery according to the present invention will now be described. Gel-electrolyte batteries according to Examples 1 to 50 and Comparative Examples 1 to 14 were manufactured as follows.

Example 1

Initially, a positive electrode was manufactured as follows.

To obtain $LiCoO_2$, which was the active material of the positive electrode, lithium carbonate and cobalt carbonate were mixed with each other at a molar ratio of 0.5:1. Then, the mixed materials were baked at 900° C. at 5 hours in air. Then, 85 parts by weight of obtained $LiCoO_2$, 10 parts by weight of graphite serving as the conductive material and 3 parts by weight of vinylidene fluoride serving as the binder were mixed with one another so that a positive-electrode mix was prepared. Then, the mixed materials were dispersed in N-methyl-2-pyrolidone so that slurry was obtained. The positive-electrode mix in the form of slurry was uniformly applied to either surface of elongated aluminum foil which was a positive-electrode collector and which had a thickness of 20 µm. Then, the surface of aluminum foil was dried. Then, the aluminum foil was compression-molded by a roll pressing machine so that a positive-electrode mix layer was formed. As a result, the positive electrode composed of the positive-electrode mix layer and the positive-electrode collector was manufactured.

Then, a negative electrode was manufactured.

Pulverized powder of cokes in a quantity of 90 parts by weight and 10 parts by weight vinylidene fluoride serving as a binder were mixed so that a negative-electrode mix was prepared. Then, the negative-electrode mix was dispersed in N-methyl-2-pyrolidone so that a slurry material was prepared. The negative-electrode mix in the form of the slurry was uniformly applied to either surface of elongated copper foil serving as a negative-electrode collector and having a thickness of 10 μm. Then, the copper foil was dried, and then compression-molded so that a negative-electrode-mix layer was formed. Thus, the negative electrode composed of the negative-electrode-mix layer and the negative-electrode collector was manufactured.

A gel electrolyte was obtained as follows.

Initially, 30 g of plasticizer (the composition of the plasticizer was such that the weight ratio of EC and PC was 2:1) containing 15 parts by weight of $LiPF_6$, 10 g of vinylidene fluoride-hexafluoropropylene copolymer, 0.04 g (the percentage contents was 0.0999%) of short fiber of $Al_2O_3$ (the fiber diameter was 0.1 μm and the fiber length was 100 μm) and 60 g of dimethyl carbonate were mixed and dissolved so that a gel electrolyte solution was prepared. The gel electrolyte solution was uniformly applied to the surface of the positive-electrode mix layer and the negative-electrode mix layer formed on each collector by coating operations. Then, the formed structure was allowed to stand at room temperature for 8 hours to vaporize and remove dimethyl carbonate so that the gel electrolyte was obtained.

Then, the surfaces applied with the gel electrolyte for the positive electrode and that for the negative electrode were joined and contact-bonded to each other so that a gel electrolyte layer was formed. Thus, a 2.5 cm×4.0 cm flat gel-electrolyte battery having a thickness of 0.3 mm was manufactured.

Examples 2 to 13

A process similar to that according to Example 1 was performed except for the contents, the percentage contents, the length of the fiber and the diameter of the same of the $Al_2O_3$ in the form of short fiber contained in the gel electrolyte which were as shown in Table 1. Thus, gel-electrolyte batteries were manufactured.

Examples 14 to 21

A process similar to that according to Example 1 was performed except for $SiO_2$ employed as the fibrous insolubles contained in the gel electrolyte and the contents, the percentage contents, the length of the fiber and the diameter of the same of the $Al_2O_3$ which were as shown in Table 1. Thus, gel-electrolyte batteries were manufactured.

Examples 22 to 25

A process similar to that according to Example 1 was performed except for SiC employed as the fibrous insolubles contained in the gel electrolyte and the contents, the percentage contents, the length of the fiber and the diameter of the same of the $Al_2O_3$ which were as shown in Table 1. Thus, gel-electrolyte batteries were manufactured.

Comparative Example 1

A process similar to that according to Example 1 was performed except for a gel electrolyte which did not contain the fibrous insolubles which was employed in this comparative example. Thus, a gel-electrolyte battery was manufactured.

Comparative Example 2

A process similar to that according to Example 1 was performed except for the contents, the percentage contents, the length of the fiber and the diameter of the same of the $Al_2O_3$ in the form of short fiber contained in the gel electrolyte which were as shown in Table 1. Thus, gel-electrolyte batteries were manufactured.

Comparative Examples 3 to 6

A process similar to that according to Example 1 was performed except for $SiO_2$ employed as the fibrous insolubles contained in the gel electrolyte and the contents, the percentage contents, the length of the fiber and the diameter of the same of the $SiO_2$ which were as shown in Table 1. Thus, gel-electrolyte batteries were manufactured.

TABLE 1

| | Name of Substance | Contents (g) | Percentage Contents (%) |
|---|---|---|---|
| Example 1 | $Al_2O_3$ | 0.04 | 0.0999 |
| Example 2 | $Al_2O_3$ | 0.5 | 1.2346 |
| Example 3 | $Al_2O_3$ | 1 | 2.439 |
| Example 4 | $Al_2O_3$ | 10 | 20 |
| Example 5 | $Al_2O_3$ | 40 | 50 |
| Example 6 | $Al_2O_3$ | 0.5 | 1.2346 |
| Example 7 | $Al_2O_3$ | 0.5 | 1.2346 |
| Example 8 | $Al_2O_3$ | 0.5 | 1.2346 |
| Example 9 | $Al_2O_3$ | 0.5 | 1.2346 |
| Example 10 | $Al_2O_3$ | 0.5 | 1.2346 |
| Example 11 | $Al_2O_3$ | 0.5 | 1.2346 |
| Example 12 | $Al_2O_3$ | 0.5 | 1.2346 |
| Example 13 | $Al_2O_3$ | 0.5 | 1.2346 |
| Example 14 | $SiO_2$ | 0.04 | 0.0999 |
| Example 15 | $SiO_2$ | 40 | 50 |
| Example 16 | $SiO_2$ | 0.5 | 1.2346 |
| Example 17 | $SiO_2$ | 0.5 | 1.2346 |
| Example 18 | $SiO_2$ | 0.5 | 1.2346 |
| Example 19 | $SiO_2$ | 0.5 | 1.2346 |
| Example 20 | $SiO_2$ | 0.5 | 1.2346 |
| Example 21 | $SiO_2$ | 0.5 | 1.2346 |
| Example 22 | SiC | 0.5 | 1.2346 |
| Example 23 | SiC | 0.5 | 1.2346 |
| Example 24 | SiC | 0.5 | 1.2346 |
| Example 25 | SiC | 0.5 | 1.2346 |
| Comparative Example 1 | — | 0 | 0 |
| Comparative Example 2 | $Al_2O_3$ | 50 | 55.556 |
| Comparative Example 3 | $SiO_2$ | 0.5 | 1.2346 |
| Comparative Example 4 | $SiO_2$ | 0.5 | 1.2346 |
| Comparative Example 5 | $SiO_2$ | 0.5 | 1.2346 |
| Comparative Example 6 | $SiO_2$ | 0.5 | 1.2346 |

| | Diameter (d/μm) | Length (L/μm) | L/d |
|---|---|---|---|
| Example 1 | 0.1 | 100 | 1000 |
| Example 2 | 0.1 | 100 | 1000 |
| Example 3 | 0.1 | 100 | 1000 |
| Example 4 | 0.1 | 100 | 1000 |
| Example 5 | 0.1 | 100 | 1000 |
| Example 6 | 0.05 | 0.5 | 10 |
| Example 7 | 3 | 30 | 10 |
| Example 8 | 50 | 500 | 10 |
| Example 9 | 0.05 | 50 | 1000 |
| Example 10 | 3 | 3000 | 1000 |
| Example 11 | 50 | 50000 | 1000 |
| Example 12 | 0.05 | 150 | 3000 |
| Example 13 | 3 | 9000 | 3000 |
| Example 14 | 0.05 | 100 | 2000 |
| Example 15 | 0.05 | 100 | 2000 |
| Example 16 | 0.05 | 0.5 | 10 |
| Example 17 | 3 | 30 | 10 |
| Example 18 | 50 | 500 | 10 |

TABLE 1-continued

| | | | |
|---|---|---|---|
| Example 19 | 0.05 | 150 | 3000 |
| Example 20 | 3 | 9000 | 3000 |
| Example 21 | 50 | 150000 | 3000 |
| Example 22 | 3 | 30 | 10 |
| Example 23 | 30 | 300 | 10 |
| Example 24 | 3 | 1500 | 500 |
| Example 25 | 30 | 15000 | 500 |
| Comparative Example 1 | — | — | — |
| Comparative Example 2 | 0.1 | 100 | 1000 |
| Comparative Example 3 | 200 | 2000 | 10 |
| Comparative Example 4 | 200 | 100000 | 500 |
| Comparative Example 5 | 5 | 5 | 1 |
| Comparative Example 6 | 5 | 25000 | 5000 |

| | Discharge Capacity Retention Ratio After 400 Cycles (%) | Discharge Capacity Retention Ratio After Preservation at High Temperature (%) | Recovery Rate (%) |
|---|---|---|---|
| Example 1 | 80.1 | 79 | 92 |
| Example 2 | 82.3 | 80.1 | 91.2 |
| Example 3 | 81.9 | 82 | 93.5 |
| Example 4 | 80.5 | 82.6 | 89.4 |
| Example 5 | 79.3 | 81.9 | 90.5 |
| Example 6 | 80.6 | 82 | 92.7 |
| Example 7 | 80.4 | 82.4 | 89.9 |
| Example 8 | 79.7 | 81.2 | 89.7 |
| Example 9 | 80.1 | 81.6 | 90.5 |
| Example 10 | 80.6 | 82.3 | 91.5 |
| Example 11 | 79.9 | 81.9 | 88 |
| Example 12 | 81.3 | 81.9 | 89.5 |
| Example 13 | 82 | 78.4 | 88.1 |
| Example 14 | 84.5 | 81.2 | 90.4 |
| Example 15 | 80.9 | 81.1 | 91 |
| Example 16 | 79.6 | 80 | 89.4 |
| Example 17 | 79.2 | 80 | 90.6 |
| Example 18 | 78.9 | 80.6 | 90.1 |
| Example 19 | 81.2 | 81 | 88.8 |
| Example 20 | 81.3 | 80.4 | 89.9 |
| Example 21 | 83.1 | 79.2 | 90 |
| Example 22 | 78.5 | 79.6 | 85.1 |
| Example 23 | 78.5 | 80.1 | 87.3 |
| Example 24 | 79.7 | 81 | 87.9 |
| Example 25 | 78.9 | 81.6 | 88.6 |
| Comparative Example 1 | 41.6 | 40.5 | 52.3 |
| Comparative Example 2 | 75.1 | 78.1 | 74.1 |
| Comparative Example 3 | 59.8 | 56 | 62.8 |
| Comparative Example 4 | 67.1 | 43.5 | 59.9 |
| Comparative Example 5 | 63.7 | 49.1 | 63.1 |
| Comparative Example 6 | 58.2 | 77.7 | 68 |

Examples 26 to 38

A process similar to that according to Example 1 was performed except for poly-p-phenylene terephthalamide (PPTA) employed as the fibrous insolubles contained in the gel electrolyte and the contents, the percentage contents, the length of the fiber and the diameter of the same of the poly-p-phenylene terephthalamide (PPTA) which were as shown in Table 2. Thus, gel-electrolyte batteries were manufactured.

Example 39 to 46

A process similar to that according to Example 1 was performed except for polyethylene (PE) employed as the fibrous insolubles contained in the gel electrolyte and the contents, the percentage contents, the length of the fiber and the diameter of the same of the PE (PE) which were as shown in Table 2. Thus, gel-electrolyte batteries were manufactured.

Examples 47 and 48

A process similar to that according to Example 1 was performed except for (n-PEO) obtained by three-dimensional crosslinking polyethylene oxide (PEO) with toluidine triisocyanate and employed as the fibrous insolubles contained in the gel electrolyte and the contents, the percentage contents, the length of the fiber and the diameter of the same of the (n-PEO) which were as shown in Table 2. Thus, gel-electrolyte batteries were manufactured.

Example 49 and 50

A process similar to that according to Example 1 was performed except for (n-PMMA) obtained by three-dimensional crosslinking methyl polymethacrylate (PMMA) with polyethylene glycol diacrylate and employed as the fibrous insolubles contained in the gel electrolyte and the contents, the percentage contents, the length of the fiber and the diameter of the same of the (n-PMMA) which were as shown in Table 2. Thus, gel-electrolyte batteries were manufactured.

Comparative Example 7 and 10 to 12

A process similar to that according to Example 1 was performed except for polyethylene (PE) employed as the fibrous insolubles contained in the gel electrolyte and the contents, the percentage contents, the length of the fiber and the diameter of the same of polyethylene (PE) which were as shown in Table 2. Thus, gel-electrolyte batteries were manufactured.

Comparative Examples 8 and 9

A process similar to that according to Example 1 was performed except for poly-p-phenylene terephthalamide (PPTA) employed as the fibrous insolubles contained in the gel electrolyte and the contents, the percentage contents, the length of the fiber and the diameter of the same of poly-p-phenylene terephthalamide (PPTA) which were as shown in Table 2. Thus, gel-electrolyte batteries were manufactured.

Comparative Example 13

A process similar to that according to Example 1 was performed except for polyethylene oxide (PEO) which was not three-dimensional crosslinked with toluidine triisocyanate and which was employed as the fibrous insolubles contained in the gel electrolyte and the contents, the percentage contents, the length of the fiber and the diameter of the same of polyethylene oxide (PEO) which were as shown in Table 2. Thus, a gel-electrolyte batteries was manufactured.

Comparative Example 14

A process similar to that according to Example 1 was performed except for methyl polymethacrylate (PMMA) which was not three-dimensional crosslinked with polyethylene glycol diacrylate and which was employed as the fibrous insolubles contained in the gel electrolyte and the contents, the percentage contents, the length of the fiber and the diameter of the same of methyl polymethacrylate (PMMA) which were as shown in Table 2. Thus, a gel-electrolyte batteries was manufactured.

TABLE 2

|  | Name of Substance | Contents (g) | Percentage Contents (%) |
|---|---|---|---|
| Example 26 | PPTA | 0.04 | 0.0999 |
| Example 27 | PPTA | 0.5 | 1.234568 |
| Example 28 | PPTA | 1 | 2.439024 |
| Example 29 | PPTA | 10 | 20 |
| Example 30 | PPTA | 40 | 50 |
| Example 31 | PPTA | 0.5 | 1.234568 |
| Example 32 | PPTA | 0.5 | 1.234568 |
| Example 33 | PPTA | 0.5 | 1.234568 |
| Example 34 | PPTA | 0.5 | 1.234568 |
| Example 35 | PPTA | 0.5 | 1.234568 |
| Example 36 | PPTA | 0.5 | 1.234568 |
| Example 37 | PPTA | 0.5 | 1.234568 |
| Example 38 | PPTA | 0.5 | 1.234568 |
| Example 39 | PE | 0.04 | 0.0999 |
| Example 40 | PE | 40 | 50 |
| Example 41 | PE | 0.5 | 1.234568 |
| Example 42 | PE | 0.5 | 1.234568 |
| Example 43 | PE | 0.5 | 1.234568 |
| Example 44 | PE | 0.5 | 1.234568 |
| Example 45 | PE | 0.5 | 1.234568 |
| Example 46 | PE | 0.5 | 1.234568 |
| Example 47 | n-PEO | 0.5 | 1.234568 |
| Example 48 | n-PEO | 0.5 | 1.234568 |
| Example 49 | n-PMMA | 0.5 | 1.234568 |
| Example 50 | n-PMMA | 0.5 | 1.234568 |
| Comparative Example 7 | PE | 50 | 55.55556 |
| Comparative Example 8 | PPTA | 50 | 55.55556 |
| Comparative Example 9 | PPTA | 0.5 | 1.234568 |
| Comparative Example 10 | PE | 0.5 | 1.234568 |
| Comparative Example 11 | PE | 0.5 | 1.234568 |
| Comparative Example 12 | PE | 0.5 | 1.234568 |
| Comparative Example 13 | PEO | 0.5 | 1.234568 |
| Comparative Example 14 | PMMA | 0.5 | 1.234568 |

|  | Diameter (d/μm) | Length (L/μm) | L/d |
|---|---|---|---|
| Example 26 | 2 | 1500 | 750 |
| Example 27 | 2 | 1500 | 750 |
| Example 28 | 2 | 1500 | 750 |
| Example 29 | 2 | 1500 | 750 |
| Example 30 | 2 | 1500 | 750 |
| Example 31 | 0.05 | 0.5 | 10 |
| Example 32 | 5 | 50 | 10 |
| Example 33 | 50 | 500 | 10 |
| Example 34 | 0.05 | 50 | 1000 |
| Example 35 | 5 | 5000 | 1000 |
| Example 36 | 50 | 50000 | 1000 |
| Example 37 | 0.05 | 150 | 3000 |
| Example 38 | 50 | 150000 | 3000 |
| Example 39 | 0.05 | 100 | 2000 |
| Example 40 | 0.05 | 100 | 2000 |
| Example 41 | 0.05 | 0.5 | 10 |
| Example 42 | 4 | 40 | 10 |
| Example 43 | 50 | 500 | 10 |
| Example 44 | 0.05 | 150 | 3000 |
| Example 45 | 4 | 12000 | 3000 |
| Example 46 | 50 | 150000 | 3000 |
| Example 47 | 10 | 10000 | 1000 |
| Example 48 | 50 | 50000 | 1000 |
| Example 49 | 10 | 10000 | 1000 |
| Example 50 | 50 | 50000 | 1000 |
| Comparative Example 7 | 4 | 12000 | 3000 |
| Comparative Example 8 | 2 | 1500 | 1000 |
| Comparative Example 9 | 150 | 1500 | 10 |
| Comparative Example 10 | 250 | 125000 | 500 |
| Comparative Example 11 | 12 | 12 | 1 |
| Comparative Example 12 | 50 | 250000 | 5000 |
| Comparative Example 13 | 50 | 500 | 10 |
| Comparative Example 14 | 50 | 15000 | 500 |

|  | Discharge Capacity Retention Ratio After 400 Cycles (%) | Discharge Capacity Retention Ratio After Preservation at High Temperature (%) | Recovery Rate (%) |
|---|---|---|---|
| Example 26 | 81 | 80.1 | 90 |
| Example 27 | 83.2 | 80.1 | 91.5 |
| Example 28 | 81.2 | 80.6 | 91.5 |
| Example 29 | 83.1 | 79.2 | 90.6 |
| Example 30 | 80.1 | 80.9 | 90 |
| Example 31 | 79.9 | 81.6 | 91 |
| Example 32 | 80.3 | 81.9 | 91.2 |
| Example 33 | 80.5 | 80.9 | 91.3 |
| Example 34 | 80.6 | 80.8 | 92 |
| Example 35 | 81 | 80.7 | 91.5 |
| Example 36 | 79.5 | 79.2 | 89 |
| Example 37 | 82 | 80.6 | 90 |
| Example 38 | 79.1 | 80.8 | 90.5 |
| Example 39 | 85 | 80 | 89.7 |
| Example 40 | 83 | 80.8 | 88.8 |
| Example 41 | 84 | 81 | 90.5 |
| Example 42 | 83.1 | 82 | 90.6 |
| Example 43 | 84.4 | 80.6 | 91 |
| Example 44 | 81 | 81.2 | 89.6 |
| Example 45 | 84.8 | 82 | 90.4 |
| Example 46 | 82.3 | 80 | 89.4 |
| Example 47 | 79.1 | 79.9 | 89.5 |
| Example 48 | 79.9 | 79.2 | 90 |
| Example 49 | 84.2 | 81 | 89.6 |
| Example 50 | 83.2 | 80.7 | 89 |
| Comparative Example 7 | 77.9 | 70.5 | 64.5 |
| Comparative Example 8 | 76 | 78.1 | 70.1 |
| Comparative Example 9 | 61.3 | 55.6 | 63.8 |
| Comparative Example 10 | 59.9 | 44.4 | 61 |
| Comparative Example 11 | 63.7 | 50 | 74 |
| Comparative Example 12 | 66 | 78.3 | 70.5 |
| Comparative Example 13 | 48.2 | 52.6 | 50 |
| Comparative Example 14 | 50.3 | 60.4 | 49.7 |

EVALUATION

The cycle characteristic and the preservation characteristic at high temperatures of the thus-manufactured gel-electrolyte batteries according to Examples 1 to 50 and Comparative Examples 1 to 14 were evaluated as follows.

Each gel-electrolyte battery was charged for 5 hours with constant voltage and electric current of 30 mA at 23° C. such that the upper limit of the charge with the electric current was 4.2 V. Then, each gel-electrolyte battery was discharged with a constant electric current of 30 mA such that the end voltage was 2.5 V. The initial discharge capacity was determined as described above. Then, the foregoing charge/discharge were performed 400 cycles under the foregoing charge/discharge conditions. Then, a capacity retention ratio after 400 cycles in a state where the initial discharge capacity was 100% was determined.

Each gel-electrolyte battery was charged/discharged under the foregoing charge/discharge conditions, and then the gel-electrolyte batteries were preserved at an environmental temperature of 80° C. for 21 days. The discharge capacity after the preservation and the discharge-capacity retention ratio realized after charge and discharge were performed in a state where the initial capacity was 100% were determined.

As can be understood from Tables 1 and 2, the gel-electrolyte batteries according to Examples 1 to 50 in which the gel electrolyte layer constituted by the gel electrolyte containing fibrous insolubles exhibited satisfactory cycle characteristic and preservation easiness at high temperatures. The results were superior to those of the gel-electrolyte battery according to Comparative Example 1 in which the gel electrolyte layer was constituted by the gel electrolyte which did not contain the fibrous insolubles.

Also the gel-electrolyte batteries according to Examples 1 to 50 had the structure that the gel electrolyte layer was constituted by the gel electrolyte which contained the fibrous insolubles having the structure that the ratio L/d of the fiber length L and the fiber diameter d was not less than 10 nor more than 3000 in a quantity not less than 0.1 wt % nor more than 50 wt %. The foregoing gel-electrolyte batteries exhibited a satisfactory cycle characteristic.

The gel-electrolyte battery according to Examples 1 to 50 had the structure that the gel electrolyte layer was constituted by the gel electrolyte containing the fibrous insolubles having the structure that the fiber length L was not less than 10 $\mu$m nor more than 1 cm and the fiber diameter was not less than 0.05 $\mu$m nor more than 50 $\mu$m. The foregoing gel-electrolyte batteries exhibited further satisfactory preservation easiness at high temperatures.

As can be understood from Table 1, Comparative Example 2 had the structure that the percentage contents of fibrous insolubles $Al_2O_3$ were high than 50 wt %. Comparative Examples 3 and 4 had the structure that the fiber diameter d of the fibrous insolubles $SiO_2$ was larger than 50 $\mu$m. Comparative Example 5 had the structure that the ratio L/d of the fiber length L and the fiber diameter d of the fibrous insolubles $SiO_2$ was not higher than 10. Comparative Example 6 had the structure that the ratio L/d of the fiber length L and the fiber diameter d of the fibrous insolubles $SiO_2$ was not lower than 3000. The foregoing gel-electrolyte batteries were unsatisfactory from the viewpoint of the cycle characteristic and the preservation easiness at high temperatures as compared with Examples 1 to 25.

As can be understood from Table 2, Comparative Examples 7 and 8 had the structure that the contents percentage of fibrous insolubles PE or PPTA were higher than 50 wt %. Comparative Examples 9 and 10 had the structure that the fiber direction d of fibrous insolubles PE or PPTA was larger than 50 $\mu$m. Comparative Example 11 had the structure that the ratio L/d of the fiber length L and the fiber diameter d of the fibrous insolubles PE was not higher than 10. Comparative Example 12 had the structure that the ratio L/d of the fiber length L and the fiber diameter d of the fibrous insolubles PE was not lower than 3000. Comparative Examples 13 and 14 had the structure that the fibrous insolubles PEO or PMMA was not three-dimensionally crosslinked. The foregoing gel-electrolyte batteries were unsatisfactory from the viewpoints of the cycle characteristic and the preservation easiness at high temperatures as compared with Examples 26 to 50.

As described above, the gel electrolyte and the gel-electrolyte battery according to the present invention have the structure that the gel electrolyte contains the fibrous insolubles. As a result, the cycle characteristic and the preservation easiness at high temperatures can be improved.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A gel electrolyte, comprising:
    a plasticizer containing lithium salt;
    a matrix polymer configured to disperse said plasticizer; and
    fibrous insolubles contained within the gel electrolyte wherein the fibrous insolubles have a ratio of a length of the fibrous insoluble and a diameter of the fibrous insoluble, the ratio satisfying a value of at least 10 and up to and including 3000,
    wherein the length of the fibrous insolubles is at least 10 $\mu$m and up to and including 1 cm and the diameter of the fibrous insolubles is at least 0.05 $\mu$m and up to and including 50 $\mu$m.

2. The gel electrolyte according to claim 1, wherein said fibrous insolubles are contained in a quantity at least 0.1 wt % and up to and including 50 wt %.

3. The gel electrolyte according to claim 1, wherein said fibrous insolubles comprise an organic polymer material.

4. The gel electrolyte according to claim 1, wherein said fibrous insolubles comprise a polymer material having a crosslinked structure.

5. A gel electrolyte according to claim 1, wherein said fibrous insolubles have a characteristic that said fibrous insolubles are swollen when said fibrous insolubles are immersed in an electrolytic solution.

6. The gel electrolyte according to claim 1, wherein at least one of said matrix polymers comprises a flourine polymer.

7. A gel electrolyte according to claim 6, wherein said fluorine polymer is vinylidene fluoride or vinylidene fluoride-hexafluoropropylene copolymer.

8. A gel-electrolyte battery, comprising:
    a positive-electrode-mix layer formed on a positive-electrode collector;
    a negative-electrode-mix layer formed on a negative-electrode collector; and
    a gel-electrolyte formed between the positive-electrode-mix layer and the negative-electrode-mix layer, wherein said gel-electrolyte layer is constituted by a gel electrolyte comprising a plasticizer which contains lithium salt, a matrix polymer configured to disperse said plasticizer and fibrous insolubles contained within the gel electrolyte wherein the fibrous insolubles have a ratio of a length of the fibrous insoluble and a diameter of the fibrous insoluble, the ratio satisfying a value of at least 10 and up to and including 3000, wherein said fibrous insolubles has the length of the fibrous insolubles is at least 10 μm and up to and including 1 cm and the diameter of the fibrous insolubles is at least 0.05 μm and up to and including 50 μm.

9. The gel-electrolyte battery according to claim 8, wherein said fibrous insolubles are contained in said gel electrolyte in a quantity at least 0.1 wt % and up to and including 50 wt %.

10. The gel-electrolyte battery according to claim 8, wherein said fibrous insolubles comprise an organic polymer material.

11. The gel-electrolyte battery according to claim 8, wherein said fibrous insolubles comprise a polymer material having a crosslinked structure.

12. A gel-electrolyte battery according to claim 8, wherein said fibrous insolubles have a characteristic that said fibrous insolubles are swollen when said fibrous insolubles are immersed in an electrolytic solution.

13. The gel-electrolyte battery according to claim 8, wherein at least one of said matrix polymers comprises a flourine polymer.

14. A gel-electrolyte battery according to claim 13, wherein said fluorine polymer is vinylidene fluoride or vinylidene fluoride-hexafluoropropylene copolymer.

15. The gel-electrolyte battery according to claim 8, wherein said negative electrode contains a material, the material configured to which lithium is doped and from which lithium is dedoped.

16. The gel-electrolyte battery according to claim 15, wherein said material comprises a carbon material.

17. The gel-electrolyte battery according to claim 8, wherein said positive electrode is consisting essentially of a composite oxide of lithium and transition metal.

* * * * *